US 6,673,505 B2

(12) United States Patent
Jiang et al.

(10) Patent No.: US 6,673,505 B2
(45) Date of Patent: Jan. 6, 2004

(54) TONER COAGULANT PROCESSES

(75) Inventors: Lu Jiang, Oakville (CA); Armin R. Volkel, Palo Alto, CA (US); Chieh-Min Cheng, Rochester, NY (US); Michael A. Hopper, Toronto (CA); Walter Mychajlowskij, Mississauga (CA); Raj D. Patel, Oakville (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/106,520

(22) Filed: Mar. 25, 2002

(65) Prior Publication Data

US 2003/0180652 A1 Sep. 25, 2003

(51) Int. Cl.$^7$ ................................. C08J 3/215
(52) U.S. Cl. .................... 430/137.14; 523/333; 523/335
(58) Field of Search ..................... 430/137.14; 523/333, 523/335

(56) References Cited

U.S. PATENT DOCUMENTS

| 3,674,736 A | 7/1972 | Lerman et al. ........... 260/41 R |
| 4,137,188 A | 1/1979 | Uetake et al. ........... 252/62.1 P |
| 4,558,108 A | 12/1985 | Alexandru et al. .......... 526/340 |
| 4,797,339 A | 1/1989 | Maruyama et al. .......... 430/109 |
| 4,983,488 A | 1/1991 | Tan et al. .................... 430/137 |
| 4,996,127 A | 2/1991 | Hasegawa et al. .......... 430/109 |
| 5,066,560 A | 11/1991 | Tan et al. .................... 430/137 |
| 5,278,020 A | 1/1994 | Grushkin et al. ........... 430/137 |
| 5,290,654 A | 3/1994 | Sacripante et al. .......... 430/137 |
| 5,308,734 A | 5/1994 | Sacripante et al. .......... 430/137 |
| 5,344,738 A | 9/1994 | Kmiecik-Lawrynowicz et al. ........................... 430/137 |
| 5,370,963 A | 12/1994 | Patel et al. .................. 430/137 |
| 5,403,693 A | 4/1995 | Patel et al. .................. 430/137 |
| 5,418,108 A | 5/1995 | Kmiecik-Lawrynowicz et al. ........................... 430/137 |
| 6,132,924 A | 10/2000 | Patel et al. .................. 430/137 |
| 6,352,810 B1 * | 3/2002 | Jiang et al. ............. 430/137.14 |

OTHER PUBLICATIONS

Copending Application Ser. No. 09/877,747, filed Jun. 11, 2001, on "Toner Coagulant Processes".
Copending Application Ser. No. 09/922,263, filed Aug. 16, 2001, on "Toner Coagulant Processes".
Copending Application Ser. No. 09/810,138, filed Mar. 19, 2001 on "Toner Coagulant Processes" by Michael A. Hopper et al.
Copending Application Ser. No. 10/062,129, filed Feb. 4, 2002 on "Toner Processes" by Lu Jiang et al.
Copending Application Ser. No. 09/976,943, filed Oct. 15, 2001 on "Toner Coagulant Processes" by Daryl Vanbesien et al.

* cited by examiner

Primary Examiner—Christopher Rodee
(74) Attorney, Agent, or Firm—E. D. Palazzo

(57) ABSTRACT

A process for the preparation of a toner by mixing a colorant, a latex, optionally a wax and a polyamine salt coagulant to form toner size aggregates, wherein the polyamine salt is then neutralized or converted to an amide or hydrolyzed to an acid by the introduction of a base followed by a pH reduction with an acid to enable rapid coalescence or fusion of the aggregates.

8 Claims, No Drawings

TONER COAGULANT PROCESSES

COPENDING APPLICATIONS AND PATENTS

Illustrated in U.S. Pat. No. 6,495,302, filed Jun. 11, 2001 on Toner Coagulant Processes; U.S. Pat. No. 6,416,920, filed Mar. 19, 2001 on Toner Coagulant Processes; U.S. Pat. No. 6,500,597, filed Aug. 6, 2001 on Toner Coagulant Processes; U.S. Pat. No. 6,562,541, filed Sep. 24, 2001 on Toner Processes; and U.S. Pat. No. 6,576,389, filed Oct. 15, 2001 on Toner Coagulant Processes, the disclosures of which are totally incorporated herein by reference, are toner processes wherein a coagulant may be selected.

In U.S. Pat. No. 6,132,924, the disclosure of which is totally incorporated herein by reference, there is illustrated a process for the preparation of toner comprising mixing a colorant, a latex, and two coagulants, followed by aggregation and coalescence and wherein one of the coagulants may be polyaluminum chloride.

In U.S. Pat. No. 6,268,102, the disclosure of which is totally incorporated herein by reference, there is illustrated a process for the preparation of toner comprising mixing a colorant, a latex, and two coagulants, followed by aggregation and coalescence and wherein one of the coagulants is a poly aluminum sulfosilicate.

In copending patent application U.S. Ser. No. 08/922,437, now abandoned, the disclosure of which is totally incorporated herein by reference, there is illustrated, for example, a process for the preparation of toner comprising (i) aggregating with a metal complex, or metal ion a colorant dispersion with a latex emulsion and optional additives to form aggregates;

(ii) coalescing or fusing the aggregates; and optionally (iii) isolating, washing, and drying the toner.

In U.S. Pat. No. 6,352,810, the disclosure of which is totally incorporated herein by reference, is illustrated, for example, a process of preparing a toner comprising (i) aggregating with a coagulant of a polyamine salt, a colorant, dispersion with a latex emulsion and optional additives to form aggregates followed by optionally adding a second latex emulsion to the formed aggregates;

(ii) adding an oxidizing agent to remove the excess coagulant followed by a changing the pH with a base, heating to coalesce or fuse the aggregates;

(iii) lowering the pH to accelerate the coalescence process and optionally isolating, washing and drying the toner.

Illustrated in U.S. Pat. No. 5,994,020, the disclosure of which are totally incorporated herein by reference, are toner processes, and more specifically, a process for the preparation of toner comprising (i) preparing, or providing a colorant dispersion;

(ii) preparing, or providing a functionalized wax dispersion comprised of a functionalized wax contained in a dispersant mixture comprised of a nonionic surfactant, an ionic surfactant, or mixtures thereof;

(iii) shearing the resulting mixture of the functionalized wax dispersion (ii) and the colorant dispersion (i) with a latex or emulsion blend comprised of resin contained in a mixture of an anionic surfactant and a nonionic surfactant;

(iv) heating the resulting sheared blend of (iii) below about the glass transition temperature (Tg) of the resin particles;

(v) optionally adding additional anionic surfactant to the resulting aggregated suspension of (iv) to prevent, or minimize additional particle growth of the resulting electrostatically bound toner size aggregates during coalescence (iv);

(vi) heating the resulting mixture of (v) above about the Tg of the resin; and optionally, (vii) separating the toner particles; and a process for the preparation of toner comprising blending a latex emulsion containing resin, colorant, and a polymeric additive; adding an acid to achieve a pH of about 2 to about 4 for the resulting mixture; heating at a temperature about equal to, or about below the glass transition temperature (Tg) of the latex resin; optionally adding an ionic surfactant stabilizer; heating at a temperature about equal to, or above about the Tg of the latex resin; and optionally cooling, isolating, washing, and drying the toner.

The appropriate components and processes of the above recited copending applications and patent may be selected for the processes of the present invention in embodiments thereof.

BACKGROUND

The present invention is directed to processes, and more specifically, to chemical toner processes which involve the aggregation of a latex, colorant like pigment, or dye, and additive particles followed by the fusion of the aggregates into toner particles, and wherein aggregation can be primarily controlled by utilizing a coagulant of a polyamine salt comprising, for example, salts obtained by reacting tri(2-aminoethyl) citrate with an acid, and wherein there is more specifically selected a latex comprised of, for example, submicron resin particles of about 0.1 to about 0.4 micron in volume average diameter, suspended in an aqueous phase of water, and an anionic surfactant, and optionally a nonionic to which is added a colorant dispersion comprising, for example, submicron colorant particles of, for example, about 0.08 to about 0.3 micron in volume average diameter, anionic surfactant, or optionally a nonionic surfactant, or a mixture of both, anionic and a nonionic surfactant comprising, for example, from about 40:60 to about 60:40 weight percent mixtures of anionic to nonionic surfactant thereof, and optionally adding a wax dispersion comprising submicron wax particles of a size of, for example, about 0.1 to about 0.3 micron in volume average diameter suspended in an aqueous phase of water and an anionic surfactant, and wherein the resultant blend is stirred and heated to a temperature below the resin Tg, resulting in aggregates to which optionally is added a second latex, followed by adjusting the pH of the mixture with a base to neutralize the amine salt thereby converting the amine to an amide or hydrolyzing the amine to an acid thereby preventing or minimizing the formation of new cations or salts being generated during the coalescence, followed by heating the mixture to a temperature above the resin Tg, then lowering the pH of the mixture with an acid to fuse the aggregates.

The toners generated with the processes of the present invention are especially useful for imaging processes, especially xerographic processes, digital imaging processes, color processes and the like.

REFERENCES

In xerographic systems, especially color systems, small sized toners of from about 2 to about 8 microns can be important to the achievement of high image quality for process color applications. It is also of value to have a low image pile height to eliminate, or minimize image feel and avoid paper curling after fusing. Paper curling can be particularly pronounced in xerographic color processes primarily because of the presence of relatively high toner coverage as a result of the application of three to four color toners. During fusing moisture escapes from the paper due to high fusing temperatures of from about 120° C. to about 200° C. In the situation wherein only one layer of toner is selected, such as in one-color black or highlight color xerographic applications, the amount of moisture driven off during fusing can be reabsorbed by the paper and the resulting print remains relatively flat with minimal paper curl. In process color where toner coverage is high, the relatively thick toner plastic covering on the paper can inhibit the paper from reabsorbing the moisture, and cause substantial paper curling. These and other imaging shortfalls and problems are avoided or minimized with the toners and processes of the present invention.

Also, one can select certain toner particle sizes, such as from about 2 to about 10 microns, and with a high colorant, especially pigment loading such as from about 4 to about 15 percent by weight of toner, so that the mass of toner necessary for attaining the required optical density and color gamut can be significantly reduced to eliminate or minimize paper curl. Lower toner mass also ensures the achievement of image uniformity. However, higher pigment loading often adversely affects the charging behavior of toners. For example, the charge levels may be too low for proper toner development or the charge distributions may be too wide and toners of wrong charge polarity may be present. Furthermore, higher pigment loadings may also result in the sensitivity of charging behavior to charges in environmental conditions such as temperature and humidity. Toners prepared in accordance with the processes of the present invention minimize, or avoid these disadvantages.

There is illustrated in U.S. Pat. No. 4,996,127 a toner of associated particles of secondary particles comprising primary particles of a polymer having acidic or basic polar groups and a coloring agent. The polymers selected for the toners of the '127 patent can be prepared by an emulsion polymerization method, see for example columns 4 and 5 of this patent. In column 7 of this '127 patent, it is indicated that the toner can be prepared by mixing the required amount of coloring agent and optional charge additive with an emulsion of the polymer having an acidic or basic polar group obtained by emulsion polymerization. In U.S. Pat. No. 4,983,488, there is disclosed a process for the preparation of toners by the polymerization of a polymerizable monomer dispersed by emulsification in the presence of a colorant and/or a magnetic powder to prepare a principal resin component and then effecting coagulation of the resulting polymerization liquid in such a manner that the particles in the liquid after coagulation have diameters suitable for a toner. It is indicated in column 9 of this patent that coagulated particles of 1 to 100, and particularly 3 to 70 microns, are obtained. This process results, it is believed, in the formation of particles with a wide particle size distribution. Similarly, the aforementioned disadvantages, for example poor particle size distributions, are obtained hence classification is required resulting in low toner yields, are illustrated in other prior art, such as U.S. Pat. No. 4,797,339, wherein there is disclosed a process for the preparation of toners by resin emulsion polymerization, wherein similar to the '127 patent certain polar resins are selected; and U.S. Pat. No. 4,558,108, wherein there is disclosed a process for the preparation of a copolymer of styrene and butadiene by specific suspension polymerization. Other prior art includes U.S. Pat. Nos. 3,674,736; 4,137,188 and 5,066,560.

Emulsion/aggregation/coalescence processes for the preparation of toners are illustrated in a number of Xerox patents, the disclosures of each of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797; and also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,869,215; 5,863,698; 5,902,710; 5,910,387; 5,916,725; 5,919,595; 5,925,488; 5,977,210; 5,994,020; 6,020,101; 6,130,021; 6,120,967 and 6,628,102.

The appropriate components and processes of the above Xerox Corporation patents can be selected for the processes of the present invention in embodiments thereof.

SUMMARY OF THE INVENTION

It is a feature of the present invention to provide toner processes with many of the advantages illustrated herein.

In another feature of the present invention there are provided simple and economical processes for the preparation of black and colored toner compositions with excellent colorant dispersions, wherein the colorant particle size diameter is, for example, in the submicron of about 80 to about 200 nanometers and the dispersion is stable over a period of, for example, about 30 days, thus enabling the achievement of excellent color print quality and providing similar toner charging behavior despite differential colorant chemistry.

Also, another feature of the present invention resides in the preparation of chemical toners, such as styrene acrylate pigmented toner particles with a coagulant of a polyamine salt, which salt primarily functions to initiate aggregation and to which is added a second latex which forms a shell on the toner aggregates, followed by raising the pH of the aggregates mixture, which is of from about 2 to about 2.8 to a pH value of about 7 to about 9 to stabilize the aggregate particles preventing or minimizing further growth when the temperature of the aggregates mixture is raised above the resin Tg. The change in the pH not only stabilizes the aggregate particles, but also neutralizes the polyamine coagulant salt to an amide or hydrolyzes it to an acid under heat preventing the formation of any multivalent actions such as $NR_4+$, where $R_4$ is, for example, $CH_3$, $CH_3CH_2$, $CH_3CH_2CH_2$, or $(CH_3)_2CH$ and the like when the pH of the mixture is reduced, for example, to less than about 3 with an acid during coalescence.

Aspects of the present invention relate to a process for the preparation of toner comprising (i) generating or providing a latex emulsion containing resin, water, and an ionic surfactant, and generating or providing a colorant dispersion containing colorant, water, and an ionic surfactant, or a nonionic surfactant;

(ii) blending the latex emulsion with the colorant dispersion;

(iii) adding to the resulting blend a coagulant of a polyamine salt of an acid wherein the salt is of an opposite charge polarity to that of the surfactant latex;

(iv) heating the resulting mixture below or about equal to the glass transition temperature (Tg) of the latex resin;

(v) optionally adding a second latex comprised of resin particles suspended in an aqueous phase resulting in a shell;

(vi) adjusting with a base the pH to about 7 to about 9;
(vii) heating the resulting mixture of (vi) above about the Tg of the latex resin;
(viii) retaining the heating until the fusion or coalescence of resin and colorant is initiated;
(ix) changing the pH of the above (viii) mixture with an acid to arrive at a pH of about 1.5 to about 3.5 to thereby accelerate the fusion or the coalescence and resulting in toner particles comprised of resin, and colorant; and
(x) optionally isolating the toner; a process wherein there is added to said resulting blend (iii) said coagulant and wherein said coagulant is a polyamine salt of hydrochloric acid, or a polyamine salt of sulfuric acid;
(iv) heating the resulting mixture below the glass transition temperature (Tg) of the latex resin to form toner sized aggregates of resin and colorant;
(v) adding to the formed toner aggregates of (iv) a second latex comprised of submicron resin particles suspended in an aqueous phase resulting in a resin shell on said aggregates, and wherein the shell is of an optional thickness of from about 0.1 to about 1 micron;
(vi) adjusting the pH of said resulting toner aggregate mixture (v) with a base from an initial pH of about 1.9 to about 3 to a pH of about 7 to about 9;
(vii) heating the resulting aggregate suspension of (vi) above the Tg of the latex resin;
(viii) retaining the mixture (vii) temperature in at from about 70° C. to about 95° C. to initiate the fusion or coalescence of the toner aggregates;
(ix) changing the pH of the above (viii) mixture after about 0.5 to about 1.5 hours with an acid to arrive at a pH of about 1.7 to about 3 to thereby accelerate said fusion or said coalescence, resulting in a toner comprised of resin and colorant; and
(x) isolating said toner; a process wherein said coagulant is an organic aliphatic amino ester selected from the group consisting of tri(2-aminoethyl) citrate, 2-aminoethyl ester, 3-aminopropyl ester, 4-aminobutyl ester, 4-aminobutyroate, 5-aminopentanoate, 6-aminocaproate, quaternary ammonium ester, tertiary aminoester, aminosulfonate, aminosulfonite, aminophosphorate, and aminophosphorite; a process wherein the change in the pH with a base results in the neutralization of the polyamine salt by conversion of the amine to an amide hydrolyzed to an acid; a process wherein the neutralization of the amine with sodium hydroxide prevents the formation of positive ions of $NR_4^+$ in (ix) when the pH is lowered to a value of about 3.5 to about 5 wherein no further or minimal aggregation or particle size growth is observed; a process wherein said base is a metal hydroxide selected from the group consisting of sodium hydroxide, potassium hydroxide, and ammonium hydroxide; a process wherein said acid is selected from the group consisting of nitric acid, sulfuric acid, hydrochloric acid, citric acid, and acetic acid; a process wherein the polyamine salt coagulant is selected in the amount of about 0.075 to about 5 percent by weight of said toner comprised of resin and colorant, and wherein the total of all solid toner components is about 100 percent; a process wherein there is added to the formed toner aggregates a second latex comprised of submicron resin particles suspended in an aqueous phase containing an ionic surfactant, and wherein said second latex is selected in an amount of about 10 to about 40 percent by weight of the latex (i) to thereby form a shell on said toner aggregates; a process wherein said polyamine salt is formed by reacting an organic aliphatic amino ester with an acid, and wherein the formed salt is selected in an amount of from about 0.05 to about 10 percent by weight of toner, and wherein said toner is comprised of a latex resin and colorant; a process wherein said second latex is added and forms a shell on said aggregates of (v), and wherein the thickness of the formed shell is from about 0.1 to about 1 micron; a process wherein the added latex contains the same resin as the initial latex of (i), or wherein said added latex contains a dissimilar resin than that of the initial latex (i); a process wherein (iv) is accomplished by heating at a temperature below about glass transition temperature of the polymer contained in the latex to thereby form toner aggregates, and the coalescence (vii) is accomplished by heating at a temperature of about above the glass transition temperature of the polymer contained in the latex; a process wherein said aggregation temperature is from about 40° C. to about 60° C., and said coalescence temperature is from about 75° C. to about 97° C.; a process wherein the temperature at which the aggregation is accomplished controls the size of the aggregates, and wherein the final toner size is from about 2 to about 20 microns in volume average diameter; a process wherein the pH of the mixture resulting in (v) is increased from an initial of about 2 to about 2.6 to a final of about 5 to about 8, and wherein said base functions primarily as a stabilizer for the aggregates during said coalescence, and no or minimal particle size or GSD increase; a process wherein the colorant is a pigment, and wherein said pigment is in the form of a dispersion, which dispersion contains an ionic surfactant, and wherein said polyamine salt functions as a coagulant to primarily enable aggregation of said latex and said colorant; a process wherein the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylononitrile-acrylic acid); a process wherein the colorant is carbon black, cyan, yellow, magenta, or mixtures thereof; the toner isolated is optionally from about 2 to about 15 microns in volume average diameter, and the particle size distribution thereof is optionally from about 1.15 to about 1.30; and wherein there is added to the surface of the formed toner metal salts, metal salts of fatty acids, silicas, metal oxides, or mixtures thereof, each in an amount of from about 0.1 to about 10 weight percent of the obtained toner; a process comprising (i) generating a colorant dispersion comprised of a colorant, water, and an ionic surfactant, and separately generating a latex emulsion comprised of resin, water, and an ionic surfactant; and wherein (ii) the colorant dispersion is blended with the latex emulsion;

(iii) adding to the resulting blend containing the latex and colorant a coagulant of a polyamine salt;

(iv) heating the resulting mixture below about the glass transition temperature (Tg) of the latex resin;

(v) optionally adding a second latex comprised of resin particles suspended in an aqueous phase resulting in a shell;

(vi) followed by adjusting the pH of mixture resulting with a base, and wherein the pH of the resulting toner aggregate mixture which is at a pH of about 1.9 to about 3 is adjusted to a pH of about 7 to about 9, and wherein the amine is converted to a neutral form of an amide or an acid;

(vii) heating the resulting aggregate suspension of (vi) above the Tg of the latex resin; and (viii) changing the pH of the above (vii) mixture by the addition of an acid to arrive at a pH of about 2.8 to about 5, followed by isolating said toner comprised of resin and colorant; a process wherein there is added a wax dispersion to said blend of resin emulsion and colorant dispersion; a process comprising (i) blending a latex emulsion of resin, water, and an ionic surfactant with a colorant dispersion comprised of a colorant, water, and an ionic surfactant;

(ii) adding to the resulting blend containing the latex and colorant a polyamine salt coagulant, which coagulant is optionally formed by reacting an organic aliphatic amine with an acid to form said salt of the amine and acid;

(iii) heating the resulting mixture below about the glass transition temperature (Tg) of the latex resin to obtain aggregates; adding a second latex optionally comprised of submicron resin particles suspended in an aqueous phase to result in a shell or coating on said aggregates;

(iv) adjusting the pH with a base of from an initial pH value of about 1.9 to about 3 to a pH of about 7 to about 9;

(v) heating;

(vi) retaining the temperature at from about 70° C. to about 95° C.;

(vii) changing the pH of the mixture with an acid to arrive at a pH of about 1.5 to about 3.5; and (viii) isolating the toner; a process wherein said polyamine salt of an acid is tri(aminoethyl) citrate hydrochloric acid, 2-aminoethyl ester hydrochloric acid salt, 3-aminopropyl ester hydrochloric acid salt, 4-aminobutyl ester hydrochloric acid salt, 4-aminobutyroate hydrochloric acid salt, 5-aminopentanoate hydrochloric acid salt, 6-aminocaproate hydrochloric acid salt, aminophosphorate hydrochloric acid salt, or aminophosphorite hydrochloric acid salt; a process wherein said salt is selected in an amount of from about 0.05 to about 10 weight percent by weight of toner; a process wherein said coagulant is tri(2-aminoethyl) citrate which in the presence of an acid results in the corresponding salt of the amine; a process wherein said amine salt is tri(aminoethyl) citrate hydrochloric acid salt, 2-aminoethyl ester hydrochloric acid salt, or 3-aminopropyl ester hydrochloric acid salt; a toner process comprising aggregation of latex, colorant, and a wax in the presence of a coagulant of a polyamine salt, and wherein the polyamine salt facilitates the aggregation of the latex, colorant and wax upon heating below the resin Tg, and wherein the excess or remaining unused polyamine salt added as a coagulant is neutralized by converting the amine salt into an amide or hydrolyzing it to an acid with the introduction of a base thus preventing the formation of any new multivalent actions, such as $NR_4^+$, wherein the pH of the mixture can be lowered to a value of less than about 3, such as from about 1 to about 2.7, during the coalescence and wherein the generation of the ions which could act as future undesirable coagulants thereby initiating further growth in particle size when the pH of the mixture is reduced below about 3.5, and wherein there are generated toner compositions with, for example, a volume average diameter of from about 1 micron to about 25 microns, and more specifically, from about 2 microns to about 12 microns, and a narrow particle size distribution of, for example, from about 1.10 to about 1.33, and more specifically, a size distribution of about 0.11 to about 1.25, the size and size distribution being measured by a Coulter Counter, without the need to resort to conventional pulverization and classification methods; toner aggregation processes wherein minimum washing, for example about 2 to about 4 washings are needed, and wherein there is permitted a suitable toner triboelectrical charge such as greater than about 20 $\mu$C/g at 20 percent RH; a process wherein a class of organic aliphatic salts such as tris(aminoethyl) citriate hydrochloric acid salt, 2-aminoethyl ester hydrochloric acid salt, 3-aminopropyl ester hydrochloric acid salt, 4-aminobutyl ester hydrochloric acid salt, 4-aminobutyroate hydrochloric acid salt, 5-aminopentanoate hydrochloric acid salt, 6-aminocaproate hydrochloric acid salt, aminophosphorate hydrochloric acid salt, aminophosphorite hydrochloric acid salt and the like as are selected as coagulating agents, especially in conjunction with, for example, a styrene acrylate latex thereof wherein the emulsion has a low pH, for example a pH of about 2; and wherein the use of the polyamine salts provides a process where the pH can easily be lowered to about 2.5 during coalescence, resulting in a coalescence rate which is about 1.5 to about 2 times faster than a process utilizing polyaluminum chloride as a coagulant; processes wherein the toners generated are roll milled and aged over a period of, for example, about 2 to about 3 hours resulting in stable and negative toner charging with, for example, no or minimal wrong sign positively charged toner; a process wherein the amine is tri(2-aminoethyl) citrate, 2-aminoethyl-ester, 3-aminoethylpropyl ester, 4-aminobutyl-ester, 4-aminobutyroate, 5-aminopentanoate, 6-aminocaproate, quaternary ammonium ester, tertiary aminoester, aminosulfonate, aminosulfonite, aminophosphorate, aminophosphorite, or mixtures thereof; a process wherein the amines can be reacted with an acid, such as hydrochloric acid, sulfuric acid, nitric acid phosphoric acid or acetic acid; a process wherein the polyamine salt is selected in an amount of from about 0.05 to about 10 weight percent, and more specifically, from about 0.1 to about 5 percent by weight of toner solids of latex resin, colorant, wax, when present, and polyamine salt, and wherein the latex resin, colorant, and wax amount totals about 100 percent; a process wherein the neutralization of the polyamine salt after obtaining the toner size aggregates of resin and colorant particles is conducted in the presence of the base of a metal hydroxide of sodium hydroxide, potassium hydroxide, or ammonium hydroxide, and wherein the base concentration is about 0.5 to about 20 percent and preferably of about 1 to about 10 percent metal by weight of water, causing the amine to convert into an amide or hydrolyze to an acid when the toner aggregates are heated above the resin Tg.

The neutralization of the amine is represented by the following reactor schemes

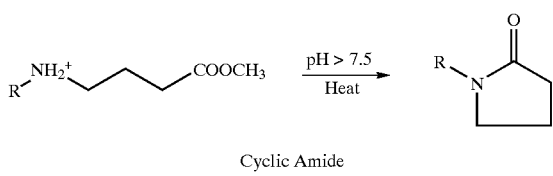

Cyclic Amide wherein R is alkyl, such as $CH_3$, $CH_3CH_2$, $CH_3CH_2CH_2$, or $(CH_3)_2CH$, and the like; and the temperature is about 50° C. to about 90° C.;

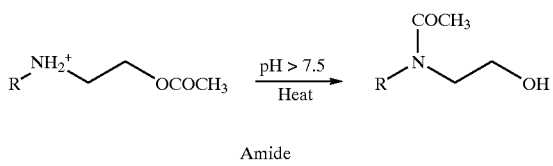

Amide wherein R is alkyl, such as $CH_3$, $CH_3CH_2$, $CH_3CH_2CH_2$, or $(CH_3)_2CH$, and the like; and the temperature is about 50° C. to about 90° C.; and

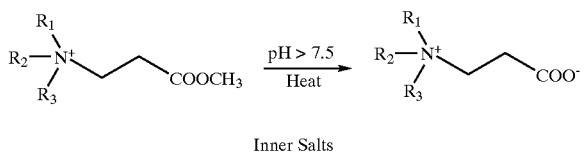

Inner Salts wherein R is alkyl, such as $CH_3$, $CH_3CH_2$, $CH_3CH_2CH_2$, or $(CH_3)_2CH$, and the like; and the temperature is about 50° C. to about 95° C.; a process wherein there is optionally added to the formed toner aggregates a second latex comprised of submicron resin particles suspended in an aqueous phase containing an ionic surfactant, and wherein the second latex is selected in an amount of about 10 to about 40 percent by weight of the initial latex to form a shell on the aggregates; a process wherein the added latex contains the same resin as the initial latex, or wherein the added latex contains a dissimilar resin than that of the initial latex; a process wherein the temperature at which the aggregation is accomplished controls the size of the aggregates, and wherein the final toner size is from about 2 to about 15 microns in volume average diameter; a process wherein the aggregation (iv) temperature is from about 45° C. to about 55° C., and wherein the coalescence or fusion temperature of (vii) and (viii) is from about 85° C. to about 95° C.; a process wherein the coagulant is added during or prior to aggregation of the latex resin and colorant, and which coagulant enables or initiates the aggregation; a process wherein the colorant is carbon black, cyan, yellow, magenta, or mixtures thereof; a process wherein the toner isolated is from about 2 to about 15 microns in volume average diameter, and the particle size distribution (GSD) thereof is from about 1.15 to about 1.30; and wherein there is added to the surface of the formed toner additives, such as metal salts, metal salts of fatty acids, silicas, metal oxides, or mixtures thereof, each in an amount of from about 0.1 to about 10 weight percent of the obtained toner; a process wherein there is added to the formed toner aggregates a second latex (v) in the amount of about 10 to about 40 percent by weight of the initial latex and preferably in an amount of about 15 to about 30 weight percent to form a shell on the latex; a process wherein the added latex comprises the same resin composition and molecular properties as the initial latex used in the blending step or a different composition and properties than that of the initial latex; a process wherein the aggregation is accomplished by heating at a temperature of below about the glass transition temperature of the polymer contained in the latex; a process wherein the coalescence is accomplished by heating at a temperature of above about the glass transition temperature of the polymer contained in the latex; a process wherein the aggregation temperature is from about 40° C. to about 62° C. and preferably is from about 45° C. to about 58° C.; a process wherein the coalescence temperature is from about 75° C. to about 95° C., and preferably about 85° C. to about 90° C.; a process wherein the amount of base selected is from about 0.5 to about 20 weight percent and preferably is about 1.0 to about 10 weight percent; a process wherein the amount of metal hydroxide selected is from about 5 to about 15 weight percent; a process wherein the latex contains submicron polymer or resin particles containing a polymer selected from the group consisting of poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid); a process wherein the latex contains a resin selected from the group consisting of poly(styrene-butadiene), poly (methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly (butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), and poly(butyl acrylate-isoprene); poly(styrene-propyl acrylate), poly (styrene-butyl acrylate), poly(styrene-butadiene-acrylic acid), poly(styrene-butadiene-methacrylic acid), poly (styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylateacrylononitrile-acrylic acid); and wherein the colorant is a pigment; a process wherein the colorant is carbon black, cyan, yellow, magenta, or mixtures thereof; a process for the preparation of toner particles resulting in images with excellent print quality, wherein there is selected a latex preferably comprised of submicron resin particles which are in the size range of about 0.05 to about 0.5 micron and preferably in the size range of about 0.07 to about 0.35 micron, suspended in an aqueous water phase containing an ionic surfactant, which is selected in an amount of about 0.5 to about 5 percent, and preferably about 0.7 to about 2 percent by weight of solids, to which is added a colorant dispersion comprising submicron, for example less than, or equal to about 0.5 micron, colorant particles, anionic or a nonionic surfactant which is selected in the range amount of about 0.5 to about 10.0 percent and preferably about 0.6 to about 5 percent by weight of solids, which when blended together result in a mixture with a pH in the range of about 2 to about 2.6 to which a polyamine salt of an acid such as a polyamine salt of a hydrochloric acid is added slowly over, for example, a period of about 2 to about 5 minutes, wherein the amount of polyamine salt preferably in the range of about 0.1 to about 5 percent by weight of the final toner comprising latex solids, colorant and the said optional wax components; further aggregating by stirring and heating from about 5 to 10 degrees below the resin Tg, resulting in toner aggregates of a size of about 3 to about 15 microns and preferably about 4 to about 8 microns with a narrow GSD in the range of, for example, about 1.14 to about 1.28 and preferably in the range of about 1.17 to about 1.25; followed by adjusting the pH of the mixture from about 2 to about 2.6 to a pH of about 6 to about 9 and preferably to about 7 to about 8.5, and more preferably to a pH of about 8 with the addition of a dilute base solution of 4 weight percent of sodium hydroxide to primarily stabilize the aggregates, and neutralize the amine to an amide or hydrolyze the amine to an acid; further stirring and increasing the mixture temperature above the resin Tg in the range of about 70° C. to about 95° C., and preferably in the range of about 85° C. to about 93° C. for a period of about 0.5 to about 1.5 hours, followed by changing the pH from about 8 to about 3 by the use of an acid, such as dilute nitric acid, wherein the concentration of acid is in the range of about 0.5 to about 10 weight percent and preferably in the range of about 0.75 to about 5 weight percent, and heating the mixture for an additional about 0.5 to about 4 hours and preferably from about 0.6 to about 3 hours to fuse or coalesce the aggregates, and then washing and drying the toner; a process wherein the use of an oxidizing agent allows the pH of the mixture to be reduced below a pH of 3 enabling rapid spheroidization; processes for the preparation of toner compositions which comprise blending an aqueous colorant dispersion preferably containing a pigment, such as carbon black, phthalocyanine, quinacridone or RHODAMINE B™ type, red, green, orange, brown, violet, yellow, fluorescent colorants and the like, with a latex emulsion derived from the emulsion polymerization of monomers selected, for example, from the group consisting of styrene, butadiene, acrylates, methacrylates, acrylonitrile, acrylic acid, methacrylic acid, itaconic or beta carboxy ethyl acrylate (β CEA) and the like, and which latex contains an ionic surfactant, such as sodium dodecylbenzene sulfonate, and optionally a nonionic surfactant, and which process is accomplished in the presence of a polyaluminum chloride or a metal salt; and a process wherein the particle size of the toner provided by the processes of the present invention in embodiments can be controlled, for example, by the temperature at which the aggregation of latex, colorant, such as pigment and optional additives, is conducted. In general, the lower the aggregation temperature, the smaller the aggregate size, and thus the final toner size. For a latex polymer with a glass transition temperature (Tg) of about 55° C. and a reaction mixture with a solids content of about 14 percent by weight, an aggregate size of about 7 microns in volume average diameter is obtained at an aggregation temperature of about 53° C.; the same latex will provide an aggregate size of about 5 microns at a temperature of about 48° C. under similar conditions.

Cationic coagulants that can be slected include, for example, polyaluminum chloride, polyaluminum sulfo silicate, or an alkyl benzylamonium chloride, and which coagulants are effective as aggregating agents in a pH environment of about 2 to about 3.5. As the pH is increased the effectiveness of the coagulant as a aggregating agent is reduced; for example, when the pH of the mixture is increased from about 4 to about 5.5, the effectiveness of aggregation can be reduced by about 50 percent.

Therefore, the aggregation is mainly performed at a pH in the range of about 2 to about 3. However, to neutralize the cationic power and prevent further aggregation the pH can be increased to a basic value, for example, in the range of about 7 to about 8 with a base, and the aggregate mixture is heated above the Tg of the resin. At such pH values and at high temperature, for example about 95° C., the fusion or the coalescence of the aggregates is very difficult and hence the pH has to be reduced to about 4 to begin the fusion or the coalescence step. This reduction in pH often has to be performed slowly, for example over a period of 30 minutes, with very dilute acid solution to avoid the reformation of the actions which will result in further aggregations.

The utilization of a positive charge on the polyamine salt as a coagulating agent, and wherein the positive charge is then neutralized by changing the pH of the mixture with a base to form an amide or an acid instead of using organic or inorganic oxidization reagents, thereby preventing the formation of the multivalent actions, such as $NR_4^+$, during the coalescence step when the pH is lowered, for example, to a pH value of less than about 3.3, which positive ions are the source of flocculation of the already formed aggregates. To illustrate this, in the process utilizing polyamine salts as a coagulant to aggregate the latex resin particles and the colorant particles to form the aggregates, which aggregates are then stabilized against further growth by changing the pH value which is about 2 to about 3 to about 7 to about 9 with a base results in neutralizing the polyamine salt and hence the positive charge followed by heating the mixture above the resin Tg for the coalescence for the fusion (viii). The neutralization of the positive charge prevents or minimizes the formation of any multivalent actions at relatively low pH of about 3 when the pH is reduced from about 7 to about 3 with an acid in (ix).

Thus, in embodiments the present invention is directed towards resolving the problem of the reformation of the multivalent actions at low pH, for example when the pH is less than about 3.3 neutralizing the polyamine salts after the completion of the aggregation step and before the beginning of the coalescence step in the presence of a base of metal hydroxide, wherein the polyamine salt when neutralized is very stable in either an amide or acid and hence the reformation of the multivalent actions, such as those mentioned above, are prevented. Furthermore, the present invention allows the pH during the coalescence (ix) to be further reduced, for example in the range of about 1.7 to about 3, resulting in a faster coalescence or the fusion of the aggregates by about 50 percent as compared with the acid case enabling faster spheroidization. The present invention also enables in embodiments acceptable stable toner triboelectrical toner values with minimum toner washings; a volume average diameter of from between about 1 to about 25 microns, and preferably from about 2 to about 12 microns, and a particle size distribution of about 1.10 to about 1.28, and preferably from about 1.15 to about 1.25, each as measured by a Coulter Counter without the need to resort to conventional classifications to narrow the toner particle size distribution; a process where the latex can be prepared by batch polymerization and optionally a semi-batch polymerization process containing submicron resin particles suspended in an aqueous phase of surfactants which are aggregated with submicron pigment particle suspended in an aqueous phase of a surfactant by a polyamine salt coagulant resulting by reacting tri(2-aminoethyl) citrate and an acid, such as hydrochloride acid, to form the said polyamine salt coagulant; a process where there are provided toner compositions with low fusing temperatures of from about 140° C. to about 185° C., and which toner compositions exhibit excellent blocking characteristics at and above about, or equal to about 48° C., as well as the toners generate excellent print quality and high resolution color prints.

Illustrative examples of specific latex resins, resin, polymer or polymers selected for the process of the present invention and present in the latex include known polymers such as poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and the like. The latex polymer, or resin is generally present in the toner compositions of the present invention in various suitable amounts, such as from about 75 weight percent to about 98, or from about 80 to about 95 weight percent of the toner or of the solids, and the latex size suitable for the processes of the present invention can be, for example, preferably from about 0.05 micron to about 0.5 micron in volume average diameter as measured by the Brookhaven nanosize particle analyzer. Other sizes and effective amounts of latex polymer may be selected in embodiments. The total of all toner components, such as resin and colorant, is about 100 percent, or about 100 parts.

The polymer selected for the processes of the present invention can be prepared by emulsion polymerization methods, and the monomers utilized in such processes include, for example, styrene, acrylates, methacrylates, butadiene, isoprene, acrylic acid, methacrylic acid, itaconic acid, beta carboxy ethyl acrylate, acrylonitrile, and the like. Known chain transfer agents, for example dodecanethiol, from, for example, about 0.1 to about 10 percent, or carbon tetrabromide in effective amounts, such as for example from about 0.1 to about 10 percent, can also be utilized to control the molecular weight properties of the polymer when emulsion polymerization is selected. Other processes of obtaining polymer particles of from, for example, about 0.01 micron to about 2 microns can be selected from polymer microsuspension process, such as disclosed in U.S. Pat. No. 3,674,736, the disclosure of which is totally incorporated herein by reference; polymer solution microsuspension process, such as disclosed in U.S. Pat. No. 5,290,654, the disclosure of which is totally incorporated herein by reference; mechanical grinding processes, or other known processes. Also, the reactant initiators, chain transfer agents, and the like as disclosed in U.S. application Ser. No. 08/922,437, the disclosure of which is totally incorporated herein by reference, can be selected for the processes of the present invention.

Examples of waxes include those as illustrated herein, such as those of the aforementioned copending applications, polypropylenes and polyethylenes commercially available from Allied Chemical and Petrolite Corporation, wax emulsions available from Michaelman Inc. and the Daniels Products Company, EPOLENE N-15 commercially available from Eastman Chemical Products, Inc., VISCOL 550-P, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions of the present invention are believed to have a molecular weight of from about 4,000 to about 5,000. Examples of functionalized waxes include, such as amines, amides, for example aqua SUPERSLIP 6550, SUPERSLIP 6530 available from Micro Powder Inc., fluorinated waxes, for example POLYFLUO 190, POLYFLUO 200, POLYFLUO 523XF, AQUA POLYFLUO 411, AQUA POLYSILK 19, POLYSILK 14 available from Micro Powder Inc., mixed fluorinated, amide waxes, for example MICROSPERSION 19 also available from Micro Powder Inc., imides, esters, quaternary amines, carboxylic acids or acrylic polymer emulsion, for example JONCRYL 74, 89, 130, 537, and 538, all available from SC Johnson Wax, chlorinated polypropylenes and polyethylenes commercially available from Allied Chemical and Petrolite Corporation and SC Johnson wax.

Various known colorants, such as pigments, selected for the processes of the present invention and present in the toner in an effective amount of, for example, from about 1 to about 25 percent by weight of toner, and preferably in an amount of from about 3 to about 10 percent by weight, that can be selected include, for example, carbon black like REGAL 330®. As colored pigments, there can be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E. I. DuPont de Nemours & Company, and the like. Generally, colored pigments that can be selected are cyan, magenta, or yellow pigments, and mixtures thereof. Examples of magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans that may be selected include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, Yellow 180 and Permanent Yellow FGL components may also be selected as pigments with the process of the present invention, wherein the pigment is in the range of 3 to 15 weight percent of the toner. Dye examples include known suitable dyes, reference the Color Index, and a number of U.S. patents, such as food dyes, and the like.

Colorants include pigment, dye, mixtures of pigment and dyes, mixtures of pigments, mixtures of dyes, and the like.

Examples of initiators for the latex preparation include water soluble initiators, such as ammonium and potassium persulfates, in suitable amounts, such as from about 0.1 to about 8 percent and preferably in the range of from about 0.2 to about 5 percent (weight percent). Examples of organic soluble initiators include Vazo peroxides, such as VAZO 64™, 2-methyl 2-2'-azobis propanenitrile, VAZO 88™, 2-2'-azobis isobutyramide dehydrate in a suitable amount, such as in the range of from about 0.1 to about 8 percent. Examples of chain transfer agents include dodecane thiol, octane thiol, carbon tetrabromide and the like in various suitable amounts, such as in the range amount of from about 0.1 to about 10 percent and preferably in the range of from about 0.2 to about 5 percent by weight of monomer.

Surfactants for the preparation of latexes and colorant dispersions can be ionic or nonionic surfactants, in effective amounts of, for example, from about 0.01 to about 15, or from about 0.01 to about 5 weight percent of the reaction mixture. Anionic surfactants include sodium dodecylsulfate (SDS), sodium dodecylbenzene sulfonate, sodium dodecylnaphthalene sulfate, dialkyl benzenealkyl, sulfates and sulfonates, abitic acid, available from Aldrich, NEOGEN R™, NEOGEN SC™ obtained from Kao, and the like.

Examples of nonionic surfactants selected in various suitable amounts, such as about 0.1 to about 5 weight percent, are polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenac as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™, can be selected.

The toner may also include known charge additives in effective suitable amounts of, for example, from 0.1 to about 5 weight percent, such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, negative charge enhancing additives like aluminum complexes, other known charge additives, and the like.

Surface additives that can be added to the toner compositions after washing or drying include, for example, metal salts, metal salts of fatty acids, colloidal silicas, metal oxides, strontium titanates, mixtures thereof, and the like, which additives are each usually present in an amount of from about 0.1 to about 2 weight percent, reference for example U.S. Pat. Nos. 3,590,000; 3,720,617; 3,655,374 and 3,983,045, the disclosures of which are totally incorporated herein by reference. Preferred additives include zinc stearate and AEROSIL R972® available from Degussa. The coated silicas of U.S. Pat. Nos. 6,190,815 and 6,004,714, the disclosures of which are totally incorporated herein by reference, can also be selected in amounts, for example, of from about 0.1 to about 2 percent, which additives can be added during the aggregation or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration. The carrier particles can also be comprised of a core with a polymer coating thereover, such as polymethylmethacrylate (PMMA) having dispersed therein a conductive component like conductive carbon black. Carrier coatings include silicone resins, fluoropolymers, mixtures of resins not in close proximity in the triboelectric series, thermosetting resins, and other known components.

Imaging methods are also envisioned with the toners of the present invention, reference for example a number of the patents mentioned herein, and U.S. Pat. Nos. 4,265,990; 4,858,884; 4,584,253 and 4,563,408, the disclosures of which are totally incorporated herein by reference.

The following Examples and Comparative Examples are used as illustrative purposes for the invention described, and by no means restrict the scope of the invention.

EXAMPLES

Latex Preparation/Semi-Continuous Method:

A latex emulsion comprised of polymer particles generated from the emulsion polymerization of styrene, butyl acrylate and beta carboxyl ethyl acrylate (β CEA) was prepared as follows.

An aqueous surfactant solution of 1.59 kilograms of DOWFAX 2A1™ (anionic emulsifier) and 430 kilograms of deionized water was prepared by mixing these components for 10 minutes in a stainless steel holding tank. The holding tank was then purged with nitrogen for 5 minutes before transferring into the reactor. The reactor was then continuously purged with nitrogen while being stirred at 100 RPM. The reactor was then heated to 80° C. Separately, 6.8 kilograms of ammonium persulfate initiator were dissolved in 33.55 kilograms of deionized water.

Separately, the monomer emulsion was prepared in the following manner. 366 Kilograms of styrene, 86 kilograms of butyl acrylate and 14 kilograms of β CEA, 6 kilograms of 1-dodecanethiol, 3 kilograms of dodecanediol diacrylate (ADOD), 8.05 kilograms of DOWFAX™ (anionic surfactant), and 216 kilograms of deionized water were mixed to form an emulsion; 5 percent of this emulsion was then slowly fed into the reactor containing the above aqueous surfactant phase at 80° C. to form the "seeds" while being purged with nitrogen. The above prepared initiator solution was then slowly charged into the reactor and after 10 minutes the remainder 95 percent of the monomer emulsion was continuously fed in using metering pumps.

Once all the monomer emulsion was charged into reactor, the temperature was held at 80° C. for an additional 2 hours to complete the reaction. The reactor contents were then cooled to 35° C. The latex comprised of styrene, butyl acrylate and beta carboxyl ethyl acrylate (β CEA) (in the ratio of 76.5:23.5:3 ppH respectively) resin particles were collected into a holding tank. After drying, the latex resin of styrene, butyl acrylate and beta carboxyl ethyl acrylate (β CEA) had molecular properties which were $M_w$=34,500, $M_n$=11,400 as measured by a GPC, and the onset Tg was 52.6° C. as measured by DSC. The latex was comprised of 40 percent resin, 58.5 percent water and 1.5 percent anionic surfactant.

Toner Preparation Examples

Example I

Preparation of Cyan Toner:

236 Grams of the above prepared latex emulsion product and 50 grams of aqueous blue pigment PB 15.3 dispersion having a solids content of 35.5 percent, 2 percent anionic surfactant and 62.5 water were simultaneously added to 310 milliliters of water at room temperature, about 22° C. to about 25° C., while being mixed at a shear speed of 5,000 rpm by means of a polytron (mixture A).

A coagulant of a polyamine salt was prepared in the following manner. 32 Grams of tri(2-aminoethyl) citrate were added to 68 grams of deionized water, and then acidified to a pH of 2.5 with hydrochloric acid resulting in an acidified aqueous solution of tri(2-aminoethyl) citrate hydrochloric acid salt (Solution B).

To the above mixture (A) were added over a period of 2 minutes 15.1 grams of the coagulant solution containing 3.1 grams of diethylenetriamine hydrochloric acid salt solution (B) and 11.9 grams of water, and blended at a speed of 5,000 rpm for a period of 2 minutes. The resulting mixture, which had a pH of 2.7, was then transferred to a 2 liter reaction vessel and heated at a temperature of 51° C. for 60 minutes resulting in aggregates of a size of 5 (volume average diameter through) microns and a GSD of 1.17, both as measured on a Coulter Counter. To the toner aggregates were added 108 grams of the above prepared latex emulsion, followed by stirring for an additional 20 minutes while being heated at 54° C. The aggregates comprised of latex and colorant had a particle size of 5.6 and a GSD of 1.15. The pH was adjusted from 2.7 to 8 with aqueous base solution of 4 percent sodium hydroxide and allowed to stir for an additional 15 minutes. Subsequently, the resulting mixture was heated to 95° C. and retained there for a period of 1 hour. The pH, measured with a standard pH meter, of the resultant mixture was then lowered from about 7.6 to about 2.5 with 5 percent nitric acid. After 6 hours (total) at a temperature of 95° C., the particles resulting were spheres as observed under an optical microscope and had a size of 5.8 microns with a GSD of 1.18. The reactor was then cooled down to room temperature and the particles were washed 4 times, where the wash was conducted at pH of 11, followed by 2 washes with deionized water, and a further wash out at a pH of 2. The toner particles were then dried on a freeze dryer. The toner product was comprised of 88.6 percent resin comprised of 76.5:23.5:3 ppH of styrene, butyl acrylate and beta carboxyl ethyl acrylate (β CEA) and 11.4 percent of the above cyan P.B 15.3 pigment.

Example II

Preparation of Yellow Pigment:

234.5 Grams of the above prepared latex emulsion (latex A) and 119.2 grams of aqueous yellow pigment PY 74 dispersion having a content of 14.8 percent were simultaneously added to 430 milliliters of water at room temperature, about 25° C. throughout, while being mixed at a shear speed of 5,000 rpm by means of a polytron (mixture A).

A coagulant of a polyamine salt was prepared in the following manner. 32 Grams of tri(2-aminoethyl) citrate were added to 68 grams of deionized water, and then acidified to a pH of 2.5 with hydrochloric acid resulting in an acidified aqueous solution of tri(2-aminoethyl) citrate hydrochloric acid salt (Solution B).

To the above mixture (A) were added over a period of 2 minutes 15.1 grams of the coagulant solution containing 3.1 grams of tri(2-aminoethyl) citrate hydrochloric acid salt solution (B) and 11.9 grams of water, followed by blending at a speed of 5,000 rpm for a period of 2 minutes. The resulting mixture, which had a pH of 2.7, was then transferred to a 2 liter reaction vessel and heated at a temperature of 50° C. for 60 minutes resulting in aggregates of a size of 4.9 microns and a GSD of 1.18. To the resulting toner aggregates were added 108.2 grams of the above prepared latex followed by stirring for an additional 30 minutes while being heated at 53° C. The aggregates comprised of latex and colorant had a particle size of 5.5 and a GSD of 1.15. The pH was adjusted from 2.7 to about 7.9 with aqueous base solution of 4 percent sodium hydroxide and allowed to stir for an additional 15 minutes. Subsequently, the resulting mixture was heated to 94° C. and retained there for a period of 1 hour. The pH of the resultant mixture was then lowered from about 7.6 to about 2.6 with 5 percent nitric acid. After 6.5 hours (total) at a temperature of 94° C., the toner particles were spherical in shape as observed under an optical microscope and had a size of 5.7 microns with a GSD of 1.17. The reactor was then cooled down to room temperature and the particle were washed 4 times, where the wash was conducted at a pH of 11, followed by 2 washes with deionized water, and the last wash carried out at a pH of 2. The toner was then dried on a freeze dryer. The toner resulting was comprised of 88.7 percent resin comprised of 76.5:23.5:3 ppH of styrene, butyl acrylate and beta carboxyl ethyl acrylate (β CEA), and 11.3 percent of the above Yellow 74 pigment.

Example III

Preparation of Red Toner:

236 Grams of the above prepared latex emulsion and 30 grams of aqueous red pigment PR 238 dispersion having a solids content of 30 percent were simultaneously added to 310 milliliters of water at room temperature while being mixed at a shear speed of 5,000 rpm by means of a polytron (mixture A).

A coagulant of a polyamine salt was prepared in the following manner. 32 Grams of tri(2-aminoethyl) citrate were added to 68 grams of deionized water, and then acidified to a pH of 2.5 with hydrochloric acid resulting in an acidified aqueous solution of tri(2-aminoethyl) citrate hydrochloric acid salt (Solution B).

To the above mixture A were added over a period of 2 minutes 15.1 grams of the coagulant solution containing 3.1 grams tri(2-aminoethyl) citrate hydrochloric acid of solution (B) and 11.9 grams of water, followed by blending at a speed of 5,000 rpm for a period of 2 minutes. The resulting mixture, which had a pH of 2.7, was then transferred to a 2 liter reaction vessel and heated at a temperature of 51° C. for 70 minutes resulting in aggregates of a size of 5.2 (volume average diameter through) microns and a GSD of 1.18 as measured on a Coulter Counter. To this toner aggregate were added 108 grams of the above prepared latex, followed by stirring for an additional 20 minutes while being heated at 54° C. The aggregates comprised of latex and colorant had a particle size of 5.5 and a GSD of 1.19. The pH was adjusted from 2.7 to about 8 with aqueous base solution of 4 percent sodium hydroxide and allowed to stir for an additional 15 minutes. Subsequently, the resulting mixture was heated to 95° C. and retained there for a period of 1 hour. The pH of the resultant mixture was then lowered from about 7.6 to about 2.5 with 5 percent nitric acid. After 4 hours (total) at a temperature of 95° C., the particles were spheres as observed under an optical microscope and had a size of 5.6 microns with a GSD of 1.19. The reactor was then cooled down to room temperature and the particles were washed 4 times, where the wash was conducted at pH of 11, followed by 2 washes with deionized water, and the last wash carried out at a pH of 2. The toner particles were then dried on a freeze dryer. The toner was comprised of 83.9 percent resin of 76.5:23.5:3 ppH of styrene, butyl acrylate and beta carboxyl ethyl acrylate (β CEA) and 6.1 percent of the above Red PR 238 pigment.

Example IV

Preparation of Black Toner:

236 Grams of the above prepared latex emulsion and 32 grams of aqueous REGAL 330™ dispersion having a solids content of 28 percent were simultaneously added to 310 milliliters of water at room temperature while being mixed at a shear speed of 5,000 rpm by means of a polytron (mixture A).

A coagulant of a polyamine salt was prepared in the following manner. 32 Grams of tri(2-aminoethyl) citrate were added to 68 grams of deionized water, and then acidified to a pH of 2.5 with hydrochloric acid resulting in an acidified aqueous solution of tri(2-aminoethyl) citrate hydrochloric acid salt (Solution B).

To the above mixture (A) were added over a period of 2 minutes 15.1 grams of the coagulant solution containing 3.1 grams of tri(2-aminoethyl) citrate hydrochloric acid salt solution (B) and 11.9 grams of water, followed by blending at a speed of 5,000 rpm for a period of 2 minutes. The resulting mixture, which had a pH of 2.7, was then transferred to a 2 liter reaction vessel and heated at a temperature of 51° C. for 70 minutes resulting in aggregates of a size of 5.3 (volume average diameter throughout) microns and a GSD of 1.19 as measured on a Coulter Counter. To this toner aggregate were added 108 grams of the above prepared latex, followed by stirring for an additional 20 minutes while being heated at 54° C. The aggregates comprised of latex and colorant had a particle size of 5.6 and a GSD of 1.20. The pH was adjusted from 2.7 to about 8 with aqueous base solution of 4 percent sodium hydroxide and allowed to stir for an additional 15 minutes. Subsequently, the resulting mixture was heated to 95° C. and retained there for a period of 1 hour. The pH of the resultant mixture was then lowered from about 7.6 to about 2.5 with 5 percent nitric acid. After 5 hours (total) at a temperature of 95° C., the particles were spheres as observed under an optical microscope and had a size of 5.7 microns with a GSD of 1.20. The reactor was then cooled down to room temperature and the particles were washed 4 times, where the wash was conducted at pH of 11, followed by 2 washes with deionized water, and another wash carried out at a pH of 2. The toner particles were then dried on a freeze dryer. The toner was comprised of 83.9 percent resin of 76.5:23.5:3 ppH of styrene, butyl acrylate and beta carboxyl ethyl acrylate (β CEA) and 6.1 percent of the above REGAL 330TM pigment.

Example V

Preparation of Cyan Toner Containing Wax:

225 Grams of the above prepared latex emulsion and 50 grams of aqueous blue pigment PB 15.3 dispersion having a solids content of 35.5 percent were simultaneously added to 310 milliliters of water at room temperature while being mixed at a shear speed of 5,000 rpm by means of a polytron. To this mixture were added 27.8 grams of an aqueous anionic polyethylene P 725 wax dispersion having a solids content of 28 percent (mixture A).

A coagulant of a polyamine salt was prepared in the following manner. 32 Grams of tri(2-aminoethyl) citrate were added to 68 grams of deionized water and then acidified to a pH of 2.5 with hydrochloric acid resulting in an acidified aqueous solution of tri(2-aminoethyl) citrate hydrochloric acid (Solution B).

To the above mixture (A) were added over a period of 2 minutes 15.1 grams of the coagulant solution containing 3.5 grams of tri(2-aminoethyl) citrate hydrochloric acid salt solution (B) and 12.5 grams of water, and blended at speed of 5,000 rpm for a period of 2 minutes. The resulting mixture, which had a pH of 2.7, was then transferred to a 2 liter reaction vessel and heated at a temperature of 51° C. for 60 minutes resulting in aggregates of a size of 5.3 microns and a GSD of 1.18 as measured on a Coulter Counter. To the toner aggregates were added 108 grams of the above prepared latex, followed by stirring for an additional 20 minutes while being heated at 54° C. The aggregates comprising latex, colorant and wax had a particle size of 5.5 and a GSD of 1.18.

The pH was adjusted from 2.7 to about 8 with aqueous base solution of 4 percent sodium hydroxide and allowed to stir for an additional 15 minutes. Subsequently, the resulting mixture was heated to 95° C. and retained there for a period of 1 hour. The pH of the resultant mixture was then lowered from about 7.6 to about 2.5 with 5 percent nitric acid. After 6 hours (total) at a temperature of 95° C. the particles were spheres as observed under an optical microscope and had a size of 5.8 microns with a GSD of 1.18. The reactor was then cooled down to room temperature and the particles were washed 4 times, where the first wash was conducted at pH of 11, followed by 2 washes with deionized water, and a further wash at a pH of 2. The toner particles were then dried on a freeze dryer. The toner was comprised of 83.6 percent resin comprising of 76.5:23.5:3 ppH of styrene, butyl acrylate and beta carboxyl ethyl acrylate (β CEA) and 11.4 percent of the above cyan PB 15.3 pigment and 5 percent P 725 wax.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for the preparation of toner comprising (i) generating or providing a latex emulsion containing resin, water, and an ionic surfactant, and generating or providing a colorant dispersion containing colorant, water, and an ionic surfactant, or a nonionic surfactant;

(ii) blending the latex emulsion with the colorant dispersion;

(iii) adding to the resulting blend a coagulant of a polyamine salt of an acid wherein the salt is of an opposite charge polarity to that of the latex surfactant;

(iv) heating the resulting mixture below or about equal to the glass transition temperature (Tg) of the latex resin;

(v) optionally adding a second latex comprised of resin particles suspended in an aqueous phase resulting in a shell;

(vi) adjusting with a base the pH to about 7 to about 9;

(vii) heating the resulting mixture of (vi) above about the Tg of the latex resin;

(viii) retaining the heating until the fusion or coalescence of resin and colorant is initiated;

(ix) changing the pH of the above (viii) mixture with an acid to arrive at a pH of about 1.5 to about 3.5 to thereby accelerate the fusion or the coalescence and resulting in toner particles comprised of resin, and colorant; and (x) optionally isolating the toner, and wherein said coagulant is formed by reacting an acid with an organic aliphatic amino ester selected from the group consisting of tri(2-aminoethyl) citrate, 2-aminoethyl ester, 3-aminopropyl ester, 4-aminobutyl ester, 4-aminobutyroate, 5-aminopentanoate, 6-aminocaproate, tertiary aminoester, aminosulfonate, aminosulfonite, aminophosphorate, and aminophosphorite.

2. A process in accordance with claim 1 (vi) wherein the change in the pH with a base results in the neutralization of the polyamine salt.

3. A process in accordance with claim 2 wherein the neutralization of the amine with sodium hydroxide prevents the formation of positive ions of $NR_4^+$ in (ix) when the pH is lowered to a value of about 3.5 and wherein no further or minimal aggregation or particle size growth is observed, and wherein R is alkyl.

4. A process for the preparation of toner comprising (i) generating or providing a latex emulsion containing resin, water, and an ionic surfactant, and generating or providing a colorant dispersion containing colorant, water, and an ionic surfactant, or a nonionic surfactant;

(ii) blending the latex emulsion with the colorant dispersion;

(iii) adding to the resulting blend a coagulant of a polyamine salt of an acid wherein the salt is of an a opposite charge polarity to that of the latex surfactant;

(iv) heating the resulting mixture below or about equal to the glass transition temperature (Tg) of the latex resin;

(v) optionally adding a second latex comprised of resin particles suspended in an aqueous phase resulting in a shell;

(vi) adjusting with a base the pH to about 7 to about 9;

(vii) heating the resulting mixture of (vi) above about the Tg of the latex resin;

(viii) retaining the heating util the fusion or coalescence of resin and colorant is initiated;

(ix) changing the pH of the above (viii) mixture with an acid to arrive at a pH of about 1.5 to about 3.5 to thereby accelerate the fusion or the coalescence and resulting in toner particles comprised of resin, and colorant; and (x) optionally isolating the toner, and wherein said polyamine salt is formed by reacting an organic aliphatic amino ester with an acid, and wherein the formed salt is selected in an amount of from about 0.05 to about 10 percent by weight of toner, and wherein said toner is comprised of a latex resin and colorant.

5. A process for the preparation of toner comprising (i) generating or providing a latex emulsion containing resin, water, and an ionic surfactant, and generating or providing a colorant dispersion containing colorant, water, and an ionic surfactant, or a nonionic surfactant;

(ii) blending the latex emulsion with the colorant dispersion;

(iii) adding to the resulting blend a coagulant of a polyamine salt of an acid wherein the salt is of an opposite charge polarity to that of the latex surfactant;

(iv) heating the resulting mixture below or about equal to the glass transition temperature (Tg) of the latex resin;

(v) optionally adding a second latex comprised of resin particles suspended in an aqueous phase resulting in a shell;

(vi) adjusting with a base the pH to about 7 to about 9;

(vii) heating the resulting mixture of (vi) above about the Tg of the latex resin;

(viii) retaining the heating until the fusion or coalescence of resin and colorant is initiated;

(ix) changing the pH of the above (viii) mixture with an acid to arrive at a pH of about 1.5 to about 3.5 to thereby accelerate the fusion or the coalescence and resulting in toner particles comprised of resin, and colorant; and (x) optionally isolating the toner, and wherein said polyamine salt of an acid is tri(aminoethyl) citrate hydrochloric acid salt.

6. A process in accordance with claim 5 wherein said salt is selected in an amount of from about 0.05 to about 10 weight percent by weight of toner.

7. A process for the preparation of toner comprising (i) generating or providing a latex emulsion containing resin, water, and an ionic surfactant, and generating or providing a colorant dispersion containing colorant, water, and an ionic surfactant, or a nonionic surfactant;

(ii) blending the latex emulsion with the colorant dispersion;

(iii) adding to the resulting blend a coagulant of a polyamide salt of an acid wherein the salt is of an opposite charge polarity to that of the latex surfactant;

(iv) heating the resulting mixture below or about equal to the glass transition temperature (Tg) of the latex resin;

(v) optionally adding a second latex comprised of resin particles suspended in an aqueous phase resulting in a shell;

(vi) adjusting with a base the pH to about 7 to about 9;

(vii) heating the resulting mixture of (vi) above about the Tg of the latex resin;

(viii) retaining the heating until the fusion or coalescence of resin and colorant is initiated;

(ix) changing the pH of the above (viii) mixture with an acid to arrive at a pH of about 1.5 to about 3.5 to thereby accelerate the fusion or the coalescence and resulting in toner particles comprised of resin, and colorant; and (x) optionally isolating the toner, and wherein said polyamine salt is formed by reacting an aliphatic amino ester with an acid.

8. A process in accordance with claim 7 wherein the formed salt is selected in an amount of from about 0.05 to about 10 percent by weight of toner, and wherein said toner is comprised of a latex resin and colorant.

* * * * *